(12) United States Patent
Rosen

(10) Patent No.: US 8,423,725 B1
(45) Date of Patent: *Apr. 16, 2013

(54) MULTITHREADING IMPLEMENTATION FOR FLOPS AND REGISTER FILES

(75) Inventor: Eitan Rosen, Yokneam (IL)

(73) Assignee: Marvell Israel (M.I.S.L.) Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,688

(22) Filed: Mar. 14, 2012

Related U.S. Application Data

(63) Continuation of application No. 13/149,349, filed on May 31, 2011, now Pat. No. 8,145,856, which is a continuation of application No. 12/118,390, filed on May 9, 2008, now Pat. No. 7,958, 323.

(60) Provisional application No. 60/916,950, filed on May 9, 2007.

(51) Int. Cl.
*G06F 12/00* (2006.01)

(52) U.S. Cl.
USPC .......................................... 711/154

(58) Field of Classification Search ........................ None
See application file for complete search history.

(56) References Cited

U.S. PATENT DOCUMENTS

| | | | |
|---|---|---|---|
| 6,341,347 | B1 | 1/2002 | Joy et al. |
| 6,681,345 | B1 | 1/2004 | Storino et al. |
| 6,785,890 | B2 | 8/2004 | Kalafatis et al. |
| 7,143,267 | B2 | 11/2006 | Fluhr et al. |
| 7,185,185 | B2 | 2/2007 | Joy et al. |
| 7,316,021 | B2 | 1/2008 | Joy et al. |
| 7,587,581 | B2 | 9/2009 | Joy et al. |
| 8,145,856 | B1 | 3/2012 | Rosen |

*Primary Examiner* — Hiep Nguyen

(57) ABSTRACT

A multithreading memory system, and a processor that incorporates a multithreading memory system, includes a main memory element, plural auxiliary memory elements, and a selector. The main memory element may be configured to receive a data signal and a select signal. The auxiliary memory elements may be configured to receive an output signal from the main memory element. The selector may be configured to receive an output signal from one of the auxiliary memory elements and a scan input signal. The selector may select the output signal from the auxiliary memory element or the scan input signal based on an advance thread signal. The selected one of the output signal from the at least one special memory element and the scan input signal may be forwarded to the main memory element as the control signal.

20 Claims, 5 Drawing Sheets

MULTITHREADING IMPLEMENTATION FOR FLOPS AND REGISTER FILES

CROSS REFERENCE TO PRIOR APPLICATIONS

This application is a continuation of U.S. patent application Ser. No. 13/149,349 filed on May 31, 2011, which is a continuation of U.S. application Ser. No. 12/118,390 filed on May 9, 2008 (now U.S. Pat. No. 7,958,323) which claims priority and the benefit thereof from U.S. Provisional Application No. 60/916,950 filed on May 9, 2007, all of which are hereby incorporated by reference for all purposes as if fully set forth herein.

BACKGROUND

1. Field

This disclosure relates to computing architectures. More specifically, the disclosure relates to a system and a method for a multithreading implementation for memory elements in a computing architecture.

2. Related Art

Evolving computing architectures are demanding smaller, faster and more energy and cost efficient designs. One manifestation of recent designs is multithreading of processing which intrinsically requires carrying state information and data, and frequently switching between threads according to some prearranged schedule or some event, such as, for example a cache miss. Further, multithreading requires replication of memory components for each thread, thereby increasing die area requirements, power requirements, and overall system complexity.

SUMMARY

A multithreading memory system may include a main memory element and at least two auxiliary memory elements. In some embodiments, the auxiliary memory elements may have an operational speed that is slower than in the main memory element. The main memory element may be configured to respond to a first control signal to selectively load data from a received data signal or data from a terminal auxiliary memory element, and to advance data stored in the main memory element to the at least two auxiliary memory elements. In some embodiments, the multithreading memory system may be incorporated in a processor.

In some embodiments, the multithreading memory system includes a selector circuit configured to receive the data from the terminal auxiliary memory element and a scan input signal. The selector selects between the two based on the first control signal. In an embodiment, the first control signal serves as an advance thread signal which controls the selector.

In some embodiments, the main memory element, the auxiliary memory elements, and the selector circuit are formed in a single cell. In other embodiments, the main memory element is formed in a first cell and the auxiliary memory elements are formed in a second cell that is associated with the first cell.

In some embodiments, each auxiliary memory element may comprise a D-type flip-flop or a latch pair.

Additional features, advantages, and embodiments of the disclosure may be set forth or apparent from consideration of the following detailed description, drawings, and claims. Moreover, it is to be understood that both the foregoing summary of the disclosure and the following detailed description are examples and are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
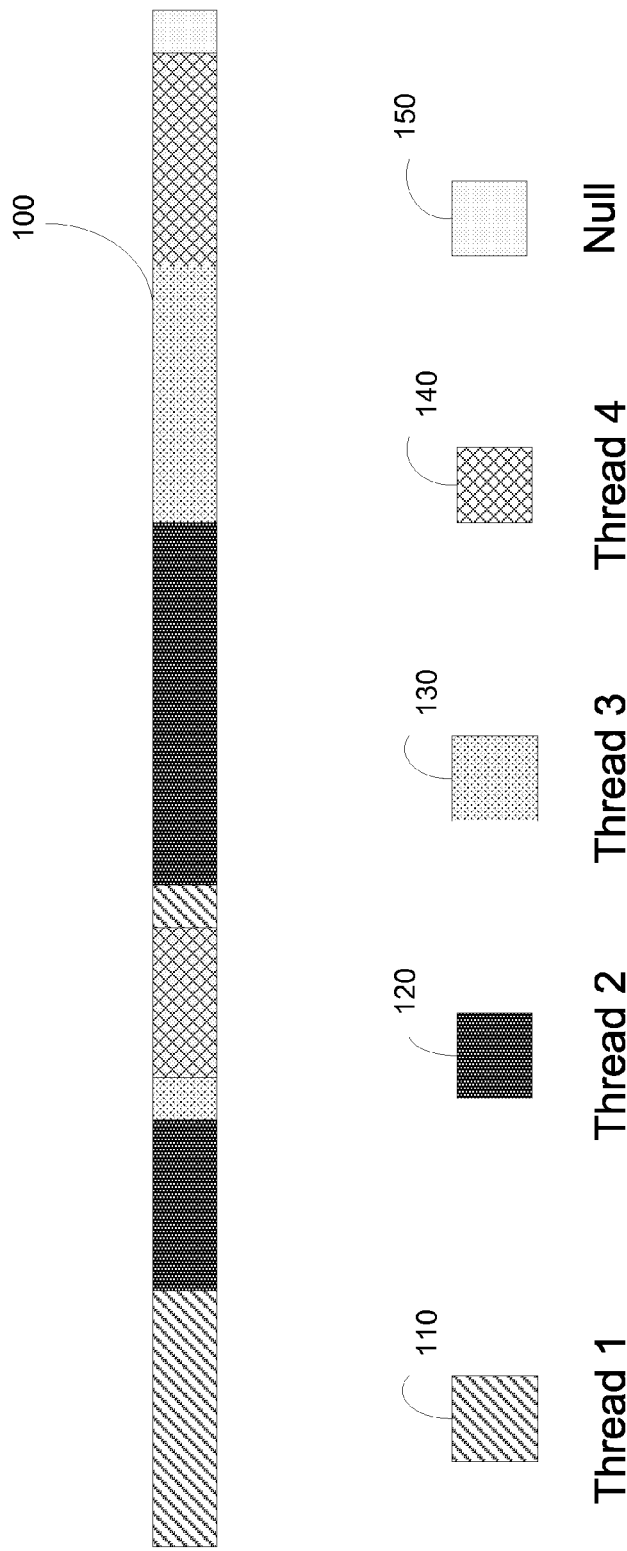
FIG. 1 shows an example of a multithread instruction execution flow in a single processor pipeline.

The embodiments of the disclosure and the various features and details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure teaching principles of the disclosed embodiments. The examples used herein are intended merely to facilitate an understanding of ways in which the disclosure may be practiced and to further enable those of skill in the art to practice the disclosed embodiments. Accordingly, the examples and embodiments herein should not be construed as limiting. Moreover, it is noted that like reference numerals represent similar parts throughout the several views of the drawings.

The present disclosure provides a system and a method for a computer architecture that includes multiple memory elements and one or more register files for at least one processor to run multiple threads substantially simultaneously. The disclosure provides for a simple, highly cost efficient (e.g., no additional time costs) and highly space efficient system and method for switching between the multiple threads as needed, or according to some pre-arranged schedule. The disclosure provides a system and a method that permit switching between threads without having to clean or reset a processor pipeline. Moreover, the disclosure provides a system and a method that replicates a state of a memory or a machine without having to replicate, for example, all of the necessary connectivity.

FIG. 1 shows an example of a multithread instruction execution flow in a single processor pipeline 100. The pipeline 100 includes, for example, four threads 110, 120, 130, 140, that may be executed substantially simultaneously from the perspective of a user. The pipeline 100 also includes a null or idle period 150, during which the processor stands idle. In the example shown, a first thread 110 may execute until, for example, a cache miss is encountered or some other event occurs, such as, e.g., a prescheduled switch time. At this point, execution of the first thread 110 may be suspended and execution of a second thread 120 may commence or resume. The second thread 120 may continue to execute until, for example, a cache miss is encountered or some other event occurs, at which point execution of the second thread 120 may be suspended and execution of a third thread 130 may commence or resume. The third thread 130 may continue to execute until, for example, a cache miss is encountered or some other event occurs, at which point execution of the third thread 130 may be suspended and execution of a fourth thread 140 may commence or resume. The fourth thread 140 may continue to execute until, for example, a cache miss is encountered or some other event occurs, at which point execution of the fourth thread 140 may be suspended and execution of the first thread 110 may be resumed or the processor may remain idle 150 and, then, the first thread 110 may recommence. This process of executing a particular thread until, for example, a cache miss is encountered or some other event occurs, and switching to another thread for execution, may continue repetitively, as shown in FIG. 1.

While the above description is provided with reference to a single processor pipeline 100 having four threads 110, 120, 130, 140, it is noted that multiple processor pipelines may be used, such as, for example, in the case of systems that include multiple cores. Further, the processor pipeline 100 may include any number of threads, including, for example, but not limited to, two threads, three threads, four threads, five threads, six threads, seven threads, etc., without departing from the scope or spirit of the disclosure.

Figure 2:
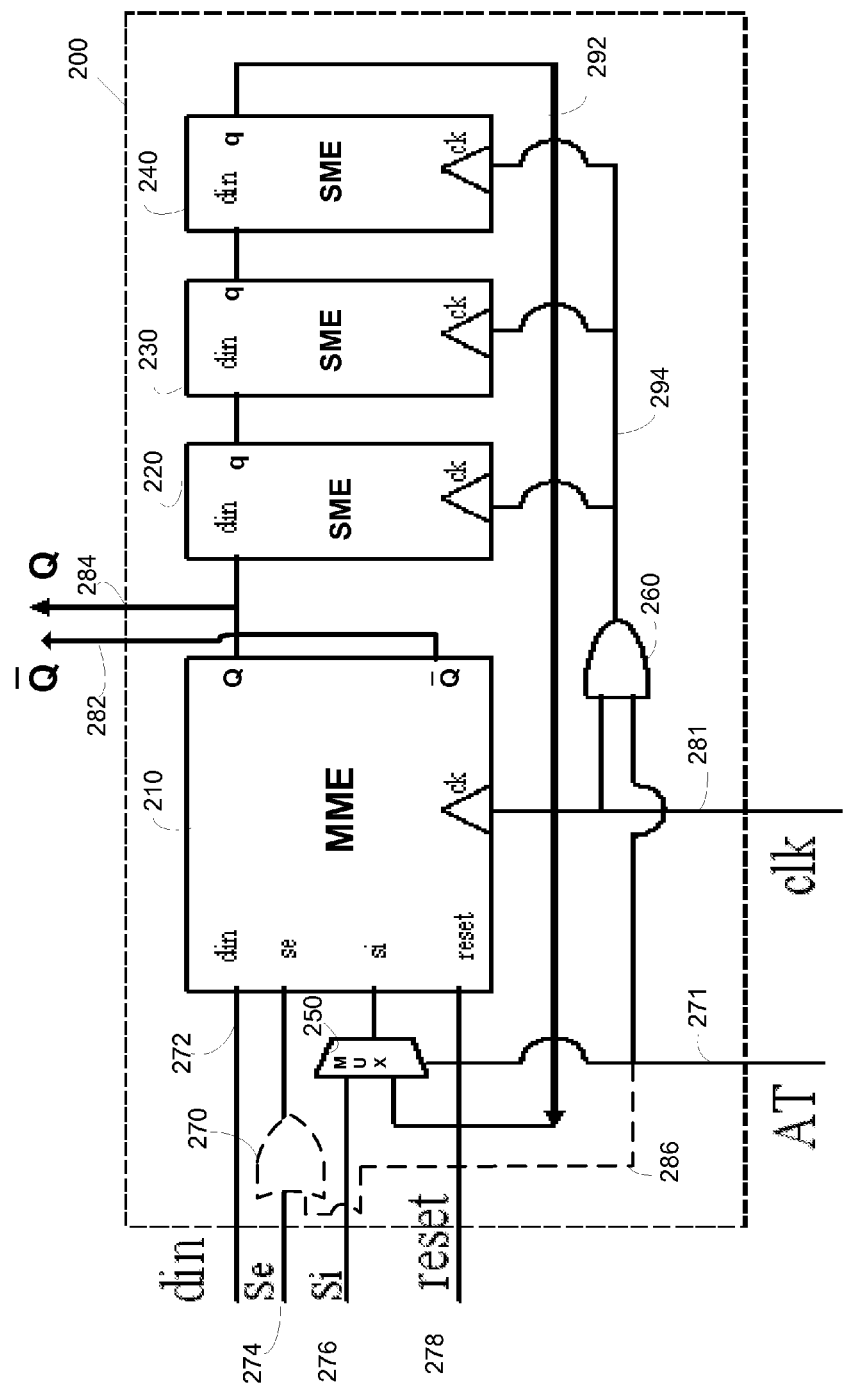
FIG. 2 shows an example of a memory system (MS), according to an embodiment of the disclosure.

FIG. 2 shows an example of a memory system (MS) 200 for use in (or with) a computer architecture that implements multithreading task execution, according to an embodiment of the disclosure. MS 200 may be part of an integrated circuit controller or processor, for example. The MS 200 of FIG. 2 may be configured to maintain multiple states with a single advance thread (AT) control signal line, allowing for switching between multiple threads without cleaning the pipeline 100 (shown in FIG. 1), while maintaining state information for each of the threads. Although described in the context of state information, it is noted that the MS 200 may provide multithreaded memory functionality for other data as well.

Referring to FIG. 2, the MS 200 may include a high speed main memory element (MME) 210, a plurality of special memory elements (SMES) 220, 230, 240, a controller 250, a logic gate 260 and a plurality of signal lines 271, 272, 274, 276, 278, 281, 282, 284, 286, 292, 294. The SMES 220 may operate at a slower speed than the MME 210. The controller 250 may be, for example, a multiplexer (MUX). Further, an optional logic gate 270 and/or an optional buffer (not shown) may also be included in the MS 200, as discussed below.

The MME 210 may be, for example, a high speed general purpose register or flop that may include built-in scan functionality. The speed, size and complexity of the MME 210 may depend on the particular application. For example, the MME 210 may include a data input $d_{in}$ for receiving a data signal din that is to be written in the MS 200, a scan enable input $s_e$ for receiving a scan enable signal Se, a scan input $s_i$ for receiving a scan input data signal Si, a reset input reset for receiving a reset signal, a clock input ck for receiving an external clock signal clk, a data output Q for outputting a data output signal Q and an optional inverse data output $\overline{Q}$ for outputting a data output signal $\overline{Q}$, which is the inverse of the data output signal Q. The scan input $s_i$ of the MME 210 is coupled to an output of the MUX 250. The data output Q is coupled to a data input $d_{in}$ of a first special memory element (SME) 220 and a data output line 284, which leads out from the MS 200. The inverse data output $\overline{Q}$ may be output from the MS 200 on a data output line 282. The clock input ck may be coupled to a clock signal (clk) line 281.

Further, the inputs of the MME 210 may be coupled to the external signal supply lines 271, 272, 274, 276, 278 and 281. For example, the data input $d_{in}$ may be coupled to the data input din signal line 272. The scan enable input $s_e$ may be coupled to the scan enable Se signal line 274. The scan input $s_i$ may be coupled to either one of the scan input Si signal line 276 or the data output line 292 from the SME 240, which feeds back to the MME 210 through the MUX 250 under control of the advance thread (AT) signal line 271. The reset input reset may be coupled to the reset signal line 278. The clock input ck may be coupled to the clock (clk) signal line 281. Additionally, the scan enable input $s_e$ of the MME 210 may be coupled to an output of the logic gate 270, which may include, for example, an OR logic gate. The logic gate 270 may include the scan enable signal line 274 and the AT signal line 286 as inputs, where the AT signal line 286 is connected to the AT signal line 271.

As noted earlier, the logic gate 270 is optional in the MS 200. Instead, the logic gate 270 and a connecting signal line 286 may be included external to the MS 200 and used for, e.g., multiple memory systems (MSS). Further, an optional buffer (not shown) may be included between the output Q of the MME 210 and the $d_{in}$ input of the SME 220, where it may be necessary to minimize a load placed on the MME 210.

A logic gate 260 may be configured as, e.g., an AND logic gate, which may have as inputs the AT signal line 271 and the clk signal line 281. The output of the logic gate 260 may be coupled to clock inputs of each of the three SMES 220, 230, 240, through a gate output line 294.

The SMES 220, 230, 240 may be arranged in a cascaded configuration, as shown in FIG. 2. Each of the SMES 220, 230, 240, may include a special, small, slow flop such as, e.g., a D-type flip-flop that includes a data input $d_{in}$, a clock input ck and a data output q. The data output of the SME 240 may be coupled to the MUX 250 through, for example, the data line 292. Each of the clock inputs ck of the SMES 220, 230, 240, are connected to the output of the logic gate 260 through the gate output line 294.

In accordance with an embodiment, the MME 210 may be formed as a main cell and the SMES 220, 230, 240, the MUX 250 and the logic gate 260 may all be formed as a second, auxiliary cell. The main cell and the auxiliary cell may be located as adjoining cells, or the cells may be located in different locations in the computer architecture. In the latter instance, the auxiliary cell would be associated with the main cell. The second, auxiliary cell may be configured as a shift register. Further, the cells may be made from, for example, customized transistor-level circuitry.

Further, the SMES 220, 230, 240, may include an SR-type flip-flop, a JK-type flip-flop, a T-type flip-flop, a latch pair, customized transistor-level circuitry, or the like, each of which may be configured to operate as, for example, a D-type data flip-flop. Moreover, the SMES 220, 230, 240 may include a shift register.

While the SMES 220, 230, 240 are disclosed as substantially identical circuits in the example of FIG. 2, the SMES may include different types of circuit configurations. For example, the SME 220 may include a D-type flip-flop, whereas the SMES 230, 240 may each include a pair of latches. Further, the MME 210 may be configured substantially identically to one or more of the SMES 220, 230, 240.

Further, additional SMES may be included by, for example, cascading the additional SMES with the existing SMES 220, 230, 240. Alternatively, fewer SMES (i.e., less than three) may be included in the MS 200. The number of SMES used may depend on the number of threads desired to operate in, for example, a single processor pipeline 100 (shown in FIG. 1). Further, the number of SMES included in the MS 200 may have a direct affect on the cost requirements (such as, e.g., monetary, cooling, energy, etc.), space requirements (such as, e.g., a larger die area), and the like, which may be taken into account when selecting the number of SMES to include in the MS 200.

Referring to FIG. 2, operation of the MS 200 may be synchronized to the external clock (clk) signal, which is provided on the clk signal line 281. The MME 210 receives a data signal din on the signal line 272 when, for example, the received signal from the logic gate 270 has a high value. The received signal from the logic gate 270 may have a high value when either or both of the signal enable Se signal on the signal line 274 or the AT signal on the signal line 271 have a high value.

Figure 3:
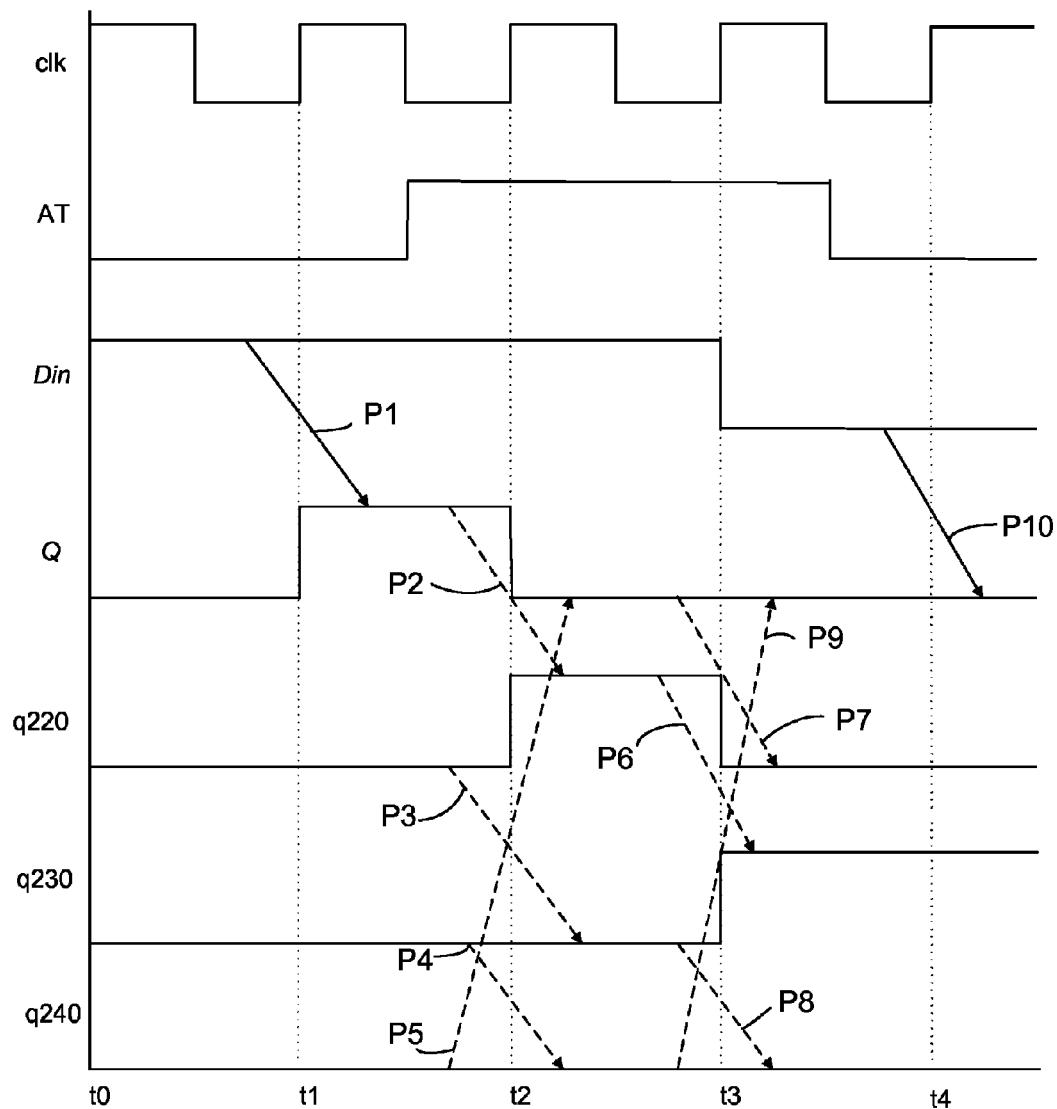
FIG. 3 shows an example of various timing diagrams that illustrate operation of the MS 200 according to an embodiment of the disclosure.

FIG. 3 shows an example of timing diagrams that illustrate aspects of the operation of the MS 200, when the MME 210 receives an advance thread (AT) signal on the AT line 271. Referring to FIG. 2, the waveform AT in FIG. 3 corresponds to the AT signal that may be received on the AT line 271. The waveform Din corresponds to the din signal that may be received on the din line 272. The waveform Q corresponds to the Q signal that may be output by the MME 210. The waveform q220 corresponds to the q signal that may be output by the SME 220. The waveform q230 corresponds to the q signal that may be output by the SME 230. The waveform q240 corresponds to the q signal that may be output by the SME 240.

Initially, a high value AT signal, which may be clocked by a falling edge of the clock signal clk, as shown in FIG. 3, may be received on the AT line 271 during the period from t1.5 to t3.5, indicating an advanced thread condition. During the same period, the received AT signal may be provided to the scan enable input of the MME 210 through the logic gate 270, thereby providing an effective scan enable signal, and an input to the gate 260 to enable supply of the clocking signal clk to each of the SMES 220, 230, 240.

Beginning at time t0, the data Din, such as, for example, but not limited to, state information, may be captured by the MME 210 (such, e.g., a value of "1") for a particular thread from the din signal line 272. The data Din may be captured by the MME 210 during the period from t0 to t1. During the same period t0 to t1, the MME 210 and the SMES 220-240 may output signals Q, q220, q230 and q240, respectively, each of which has a low value in FIG. 3.

After one clock cycle, the captured data Din may be propagated as an output signal Q of the MME 210 beginning at a time t1 on the basis of a rising edge of the clock signal clk, as shown by the arrow P1. The output signal Q may be captured by the first SME 220, beginning at the time t1, during the period t1 to t2. During the same period t1 to t2, the MME 210 output signal Q may remain at a high value and the output signals q220, q230, q240 from the SMES 220-240, respectively, each may remain at a low value.

Beginning at time t2, after a high value AT signal appears on the AT line 271 (e.g., beginning on the falling edge of the clock clk at time t1.5), the captured data Din may be propagated as the output signal q220 from the output of the first SME 220 on the basis of a rising edge of the clock signal clk, as shown by the arrow P2. The output signal q220 may be captured by the second SME 230, beginning at the time t2, during the period t2 to t3.

Also beginning at time t2, a previous value of the output signal q220 (i.e., a value during the period t1 to t2) may be propagated (as shown by the arrow P3) as the output signal q230 from the output of the second SME 230 and captured by the third SME 240, during the period t2 to t3. Further, a previous value of the output signal q230 (i.e., a value during the period t1 to t2) may be propagated (as shown by the arrow P4) as the output signal q240 from the output of the third SME 240 and applied to the line 292. Furthermore, a previous value of the output signal q240 (i.e., a value during the period t1 to t2) may be propagated (as shown by the arrow P5) as the output signal Q from the output of the MME 210.

Beginning at time t3, the captured data Din may be propagated as the output signal q230 from the output of the second SME 230 on the basis of a rising edge of the clock signal clk, as shown by the arrow P6. The output signal q230 may be captured by the third SME 240, beginning at the time t3, during the period t3 to t4.

Also beginning at time t3, a previous value of the output signal Q (i.e., a value during the period t2 to t3) may be propagated (as shown by the arrow P7) as the output signal q220 from the output of the first SME 220 and captured by the second SME 230, during the period t3 to t4. Further, a previous value of the output signal q230 (i.e., a value during the period t2 to t3) may be propagated (as shown by the arrow P8) as the output signal q240 from the output of the third SME 240 and applied to the line 292. Furthermore, a previous value of the output signal q240 (i.e., a value during the period t2 to t3) may be propagated (as shown by the arrow P9) as the output signal Q from the output of the MME 210.

At time t4, after the AT signal drops to a low level at time t3.5, a new Din, which is received during the period t3 to t4, is captured and it may be propagated as the output signal Q from the output of the MME 210 on the basis of a rising edge of the clock signal clk, as shown by the arrow P9.

The MUX 250, which is configured to select the feedback signal on the line 292 when the received AT signal has a high value, selects the captured data input signal din, which is provide on the feedback line 292 and forwards the signal to the MME 210 over the duration of an active advance thread, as shown in FIG. 3. During the period that the advance thread is active, the MME 210 ignores any further data input signals din that may be received on the din line 272. At time t3.5, the signal on the AT line 271 switches to a low value and the MME 210 again reverts to capturing data that may be received on the din line 272.

Accordingly, the MS 200 may capture data on a data input signal din for a particular thread and, under control of a single advance thread AT signal, retain the state information for the captured data. The retained state information may be provided as the output data Q on the output line 282 for the particular thread while, for example, other threads are processed in the processor pipeline 100 (shown in FIG. 1). After the advance thread AT signal is switched to a low value, the MS 200 may again capture data from the data input signal din for the particular thread. In this regard, the MS 200 may continue to capture data from a point in the data input signal din where the MS 200 had left off when it terminated data capture, i.e., just before receiving a high value on the advance thread signal AT.

Further, it may take one idle cycle of an external clock to rotate one thread. If it is required to revert to a previous thread, then N−1 cycles may be needed to rotate the threads back to the previous one, N being the number of threads. The SMES 220, 230, 240, and the MME 210, which include the reset functionality, may all be reset by simply asserting the AT control signal for N cycles while the reset input is active for each of the SMES 220, 230, 240, and the MME 210. However, during regular operation, a control, such as, for example, a reset, will only affect the thread for which the control is asserted, i.e., other threads will maintain their respective data.

Figure 4:
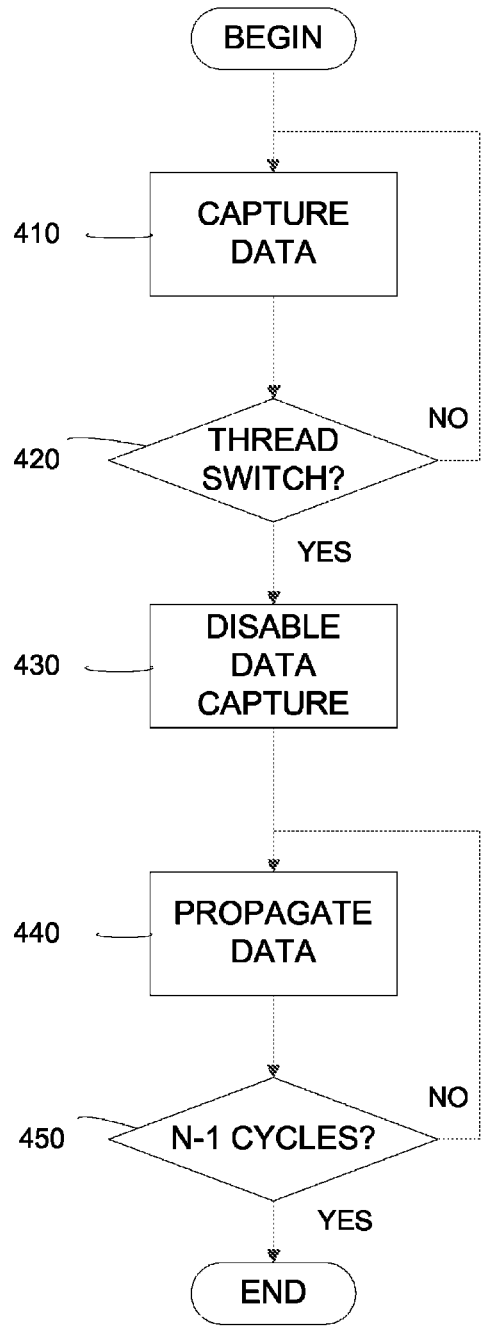
FIG. 4 shows an example of a process for implementing multithreading according to an embodiment of the disclosure.

FIG. 4 shows an example of a process for implementing multithreading, according to an embodiment of the disclosure.

Referring to FIGS. 2 and 4, data is continuously captured from an input data signal din by the MME 210 (Step 410). In the absence of a thread switch ("NO" at Step 420), the state information of the captured data may be output on the data output Q on the output signal line 282 as is known in the art. However, when a thread switch occurs ("YES" at Step 420), the MME 210 is controlled to disable further data capture (Step 430). Instead, the state information of the captured data is propagated from the MME 210 to the SME 220 under control of an advance thread signal that is received on the AT line 271 and the clock signal clk that is received on the clk line 281 (Step 440). The state information of the captured data is propagated from the SME 220 to N−2 additional SMES ("NO" at Step 450), where N is the number of available threads, until the clock clk has cycled through N−1 cycles ("YES" at Step 450).

Figure 5:
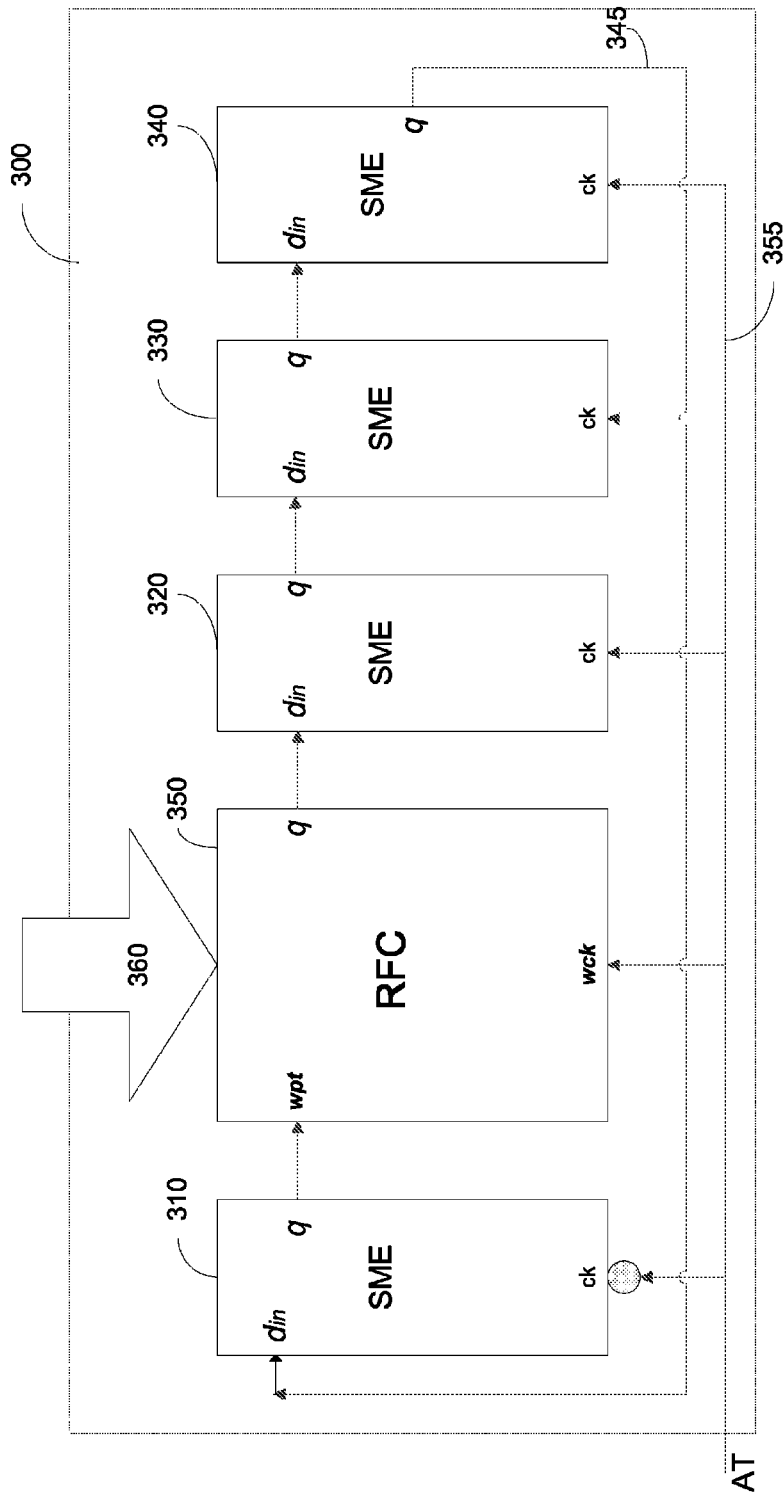
FIG. 5 shows an example of a register file system (RFS), according to an embodiment of the disclosure.

FIG. 5 shows an example of a register file system (RFS) 300 for use in (or with) a computer architecture that implements multithreading task execution, according to an embodiment of the disclosure. The RFS 300 may be configured to maintain multiple states with a single control line, allowing for switching between multiple threads without cleaning the processor pipeline 100 (shown in FIG. 1), while maintaining state information for each of the threads.

The RFS 300 may include, for example, but is not limited to, four SMES 310, 320, 330, 340, and a register file cell (RFC) 350, as shown in FIG. 5. The SMES 310, 320, 330, 340, and the RFC 350 may be arranged in a cascaded configuration with a feedback line 345, which connects the output q of the SME 340 to an input $d_{in}$ of the SME 310. An output q of the SME 310 may be connected to an additional write port wpt of the RFC 350. An output q of the RFC 350 may be connected to an input $d_{in}$ of the SME 320. An output q of the SME 320 may be connected to an input $d_{in}$ of the SME 330. An output q of the SME 330 may be connected to an input $d_{in}$ of the SME 340. A clock input ck of each of the SMES 310, 320, 330, 340, and an additional write clock input wck of the RFC 350 may be connected to an AT signal line 355.

The RFC 350 may include a register file element, such as, for example, a latch that is associated with a plurality of read/write ports 360. The RFC 350 may be an existing register file element in, for example, an n×m register file of a computer architecture, where n and m are each positive non-zero integers that may have the same or different values. Typically, n and m are both equal to thirty-two (32), thereby providing a 32 row by 32 column register file. In an embodiment, the RFC 350 includes one or more read ports and one or more write ports.

The SMES 320, 330, 340, in FIG. 4 may be similar in function and form to the SMES 220, 230, 240 discussed above. For example, the SMES 320, 330, 340, may include special, small, slow flops such as, for example, D-type flip flops.

The SME 310, however, may include, for example, a special, small, slow master latch rather than a flip flop. In other words, the SME 310 may include half-a-flop. The SME 310 may be configured to function as a master latch that controls and complements the RFC 350, which may function as a slave latch, such that the SME 310 and RFC 350 function together as, for example, a single D-type flip-flop.

As seen in FIG. 5, the AT signal on the AT signal line 355 is provided to the clock input ck of each of the SMES 310, 320, 330, 340, and the additional write clock input wck of the RFC 350. Hence, the AT signal is provided as a clock signal (i.e., an enable clock signal) instead of a control signal. Accordingly, care must be taken to avoid read or writer operations in the RFC 350 during periods when an AT signal is received (i.e., when the signal on the AT signal line 355 has a high value).

A control section (not shown) associated with the RFC 350 may be switchably configured to prevent reading from the RFC 350 (or writing to the RFC 350) during a period when an AT signal is received (an AT is active). Rather, the reading/writing functionality for the RFC 350 should be suspended while an AT signal is received (i.e., the AT is active) and a thread is advanced in the RFS 300.

Further, while the disclosure has been described in terms of example embodiments, those skilled in the art will recognize that the invention can be practiced with switchable modifications in the spirit and scope of the appended claims. These examples given above are merely illustrative and are not meant to be an exhaustive list of all possible designs, embodiments, applications or modifications of the disclosure.

What is claimed is:

1. A multithreading memory system comprising:
a main memory element configured to receive a data signal;
at least two auxiliary memory elements coupled in series to a data output of the main memory element and having a looping back coupling to a first data input of the main memory element, the at least two auxiliary memory elements having an operational speed that is slower than the main memory element,
the main memory element being configured, in response to a first control signal, to selectively load the main memory element with data from a received data signal or with data from a terminal auxiliary memory element, and to advance data stored in the main memory element to the at least two auxiliary memory elements.

2. The multithreading memory system of claim 1, wherein the looping back coupling comprises a selector circuit configured to receive the data from the terminal auxiliary memory element and a scan input signal, the selector circuit further configured to couple either the data from the terminal auxiliary memory element or the scan input signal to the first data input of the main memory element based on the first control signal.

3. The multithreading memory system of claim 2, wherein the first control signal is an advance thread signal and serves to control the selector circuit.

4. The multithreading memory system of claim 2, wherein the first data input is a scan input of the main memory element.

5. The multithreading memory system of claim 2, wherein the main memory element, the at least two auxiliary memory elements, and the selector circuit are formed in a single cell.

6. The multithreading memory system of claim 1, wherein the main memory element is formed in a first cell and the at least two auxiliary memory elements are formed in a second cell that is associated with the first cell.

7. The multithreading memory system of claim 1, wherein the main memory comprises a general purpose flop.

8. The multithreading memory system of claim 1, wherein the main memory element comprises:

a second data input configured to receive the received data signal;

a scan enable input configured to receive a scan enable signal;

a reset input configured to receive a reset signal; and a clock input configured to receive a clock signal.

9. The multithreading memory system of claim 1, wherein each auxiliary memory element comprises a clock input configured to receive the first control signal.

10. The multithreading memory system of claim 1, wherein the first control signal is an advance thread signal.

11. The multithreading memory system of claim 10, further comprising a logic gate configured to receive at least one of the advance thread signal and a clock signal.

12. The multithreading memory system of claim 10, wherein each auxiliary memory element comprises a clock input and the logic gate is further configured to output a gate signal to the clock input of said each auxiliary memory element.

13. The multithreading memory system of claim 1, wherein each auxiliary memory element comprises a D-type flip-flop or a latch pair.

14. A processor comprising the multithreading memory system of claim 1.

15. A processor having a multithreading memory system comprising:

a main memory element configured to receive a data signal; and at least two auxiliary memory elements coupled in series to a data output of the main memory element and configured to receive data stored in the main memory element in response to a first control signal, the at least two auxiliary memory elements having a looping back coupling to a first data input of the main memory element, to selectively load the main memory element with data from a received data signal or with data received from a terminal auxiliary memory element, the at least two auxiliary memory elements having an operational speed that is slower than the main memory element.

16. The processor of claim 15, wherein the first control signal is an advance thread signal.

17. The processor of claim 15, wherein the data from the received data signal is received at a first input of the main memory element, wherein the data received from the terminal auxiliary memory element is received at second input of the main memory element different from the first input.

18. A method in a processor having a multithreading memory system, the method comprising operating the multithreading memory system to perform steps of:

capturing a received data signal for a first thread;

receiving an advance thread signal to switch from the first thread to a second thread; and propagating the captured data to at least one auxiliary memory element based on the advance thread signal and a clock signal.

19. The method of claim 18, further comprising disabling data capture based on the advance thread signal.

20. The method of claim 18, wherein the propagating comprises propagating state information for N−1 cycles of the clock signal, where N is the number of available threads.

* * * * *